United States Patent
Yu et al.

(10) Patent No.: US 12,313,511 B2
(45) Date of Patent: May 27, 2025

(54) EVALUATING THE FOAMABILITY OF A SOLUTION USING A VIBRATIONAL VISCOMETER

(71) Applicant: KING FAHD UNIVERSITY OF PETROLEUM AND MINERALS, Dhahran (SA)

(72) Inventors: Wei Yu, Dhahran (SA); Hau Yung Lo, Dhahran (SA); Zhengwei Pan, Dhahran (SA); Mazen Yousef Kanj, Detroit, MI (US)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 330 days.

(21) Appl. No.: 18/168,910

(22) Filed: Feb. 14, 2023

(65) Prior Publication Data
US 2024/0060867 A1   Feb. 22, 2024

Related U.S. Application Data

(60) Provisional application No. 63/399,833, filed on Aug. 22, 2022.

(51) Int. Cl.
*G01N 11/00* (2006.01)
*G01N 13/02* (2006.01)

(52) U.S. Cl.
CPC ...... *G01N 11/00* (2013.01); *G01N 2011/0073* (2013.01); *G01N 2013/025* (2013.01)

(58) Field of Classification Search
CPC .......... G01N 11/00; G01N 2011/0073; G01N 2013/025
See application file for complete search history.

(56) References Cited

U.S. PATENT DOCUMENTS

| 4,589,276 | A | 5/1986 | Djabbarah |
| 6,807,849 | B1 | 10/2004 | Reed et al. |
| 2012/0309660 | A1* | 12/2012 | Kawasoe ............... A61Q 19/10 510/438 |

FOREIGN PATENT DOCUMENTS

| CN | 102749419 A | 10/2012 | |
| CN | 108982293 A | * 12/2018 | ............. G01N 11/02 |
| JP | 2017-3544 A | 1/2017 | |

OTHER PUBLICATIONS

English translation of CN 108982293 accessed from ip.com.*

(Continued)

*Primary Examiner* — Kristina M Deherrera
*Assistant Examiner* — Jean F Morello
(74) *Attorney, Agent, or Firm* — Oblon, McClelland, Maier & Neustadt, L.L.P.

(57) ABSTRACT

A method for evaluating the foamability of a test solution. The method includes forming foam in a vertical measurement column including an open top end and a fritted plate proximal to a bottom end by passing a gas stream through the fritted plate and through the test solution present in the vertical measurement column at a gas volume rate (GVR) and a gas flow rate (GFR). The foam travels upwards in the vertical measurement column while the gas stream is passing through the test solution. The method further includes measuring the viscosity of the foam with a vibration viscometer disposed proximal to the top end of the vertical measurement column, and further recording a plurality of vibration viscometer measurement results and storing the results (a surfactant amount $C_{surf}$, the GVR, and the GFR) in memory to determine one or more foam properties of the test solution.

17 Claims, 6 Drawing Sheets

(56) References Cited

OTHER PUBLICATIONS

Karakashev, et al. ("Foam Production—Ratio between Foaminess and Rate of Foam Decay." Journal of colloid and interface science 379.1 (2012): 144-147. Web. (Year: 2012).*
"Vibration Viscometer SV-1A", Department of Experimental Physics (upol.cz), Univerzita Palackého V Olomouci, htttps://kef.upol.cz/en/node/57, 2022, 1 page.

* cited by examiner

EVALUATING THE FOAMABILITY OF A SOLUTION USING A VIBRATIONAL VISCOMETER

CROSS REFERENCE TO RELATED APPLICATIONS

The present application is based on and claims the benefit of priority to U.S. Provisional Application No. 63/399,833, filed Aug. 22, 2022, the entire contents of which are incorporated herein by reference in its entirety.

BACKGROUND

Technical Field

The present disclosure relates to a foam characterization method and particularly relates to a method for characterizing foam properties (foamability and foam stability) using a vibrational viscometer.

Description of Related Art

The "background" description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present invention.

Aqueous foams are colloidal systems in which concentrated gas bubbles are dispersed in a continuous surfactant solution. They have been of great practical interest to everyday life and industrial applications, such as cleaning, food processing, life science, and oil production. Aqueous foams are thermodynamically unstable, and the foam structure decays over time until a minimum surface energy is reached. The lifetime of foam varies greatly, from a few seconds (beverage foams) to days or even months (nanoparticle-stabilized foams). Therefore, measuring foam stability is an important but complex task since it is dominated by multiple factors, from microscale considerations (e.g., adsorption of surfactant molecules) to macroscale considerations (e.g., liquid and gas distribution).

Several processes are involved in the decay of foams. During foam generation, the liquid films separating the bubbles (lamellae) are quite thick (wet foam). The surface elasticity of the liquid film dominates the foam stability. During the beginning stage of foam decay, the liquid solution drains rapidly through the interconnected lamellae. As the film thickness becomes small, the effect of disjoining pressure is responsible for the rupture of the foam films, according to DLVO theory. Coarsening is the phenomenon of inter-bubble gas diffusion induced by the differences between capillary pressure. Coarsening occurs throughout the foam decay process, and the coarsening rate increases with decreasing lamellae thicknesses. The lifetime of foam is dependent on the combined effect of different mechanisms. Fundamental and reliable foam stability measurements require a well-designed experimental procedure and accurate data interpretation.

Conventional methods to determine the foam stability use parameters that predict the behavior of the generated foam in a foam column. The height or volume of the foam changing with time is usually used as the measuring quantity. Different methods mainly differ in the fashion of foam generation, including shaking, pouring, bubbling, vibrating, and pneumatic sparging. For example, the Bartsch method shakes a certain amount of solution vigorously in a sealed cylinder, while the Ross-Miles method pours a certain amount of surfactant solution from the top of a vessel at a standard distance. The main advantage of the Bartsch and Ross-Miles methods lies in their simplicity, but the gas dispersed into the foams is not well controlled. Other methods, such as pneumatic methods, can strictly control the amount and velocity of the gas dispersed into the liquid by flowing the gas through a mesh, a porous filter, or a sintered glass frit at a specific flow rate. A commercially available device called Foamscan adopts the pneumatic method to generate foams; however, the foam generation process is time-consuming. Yet another conventional method involves using an apparatus called SITA Foam Tester 200018, developed for foam characterization, wherein a rotor introduces the gas phase. However, the gas phase dispersed into the foams is not well controlled by this method.

Various parameters have been derived from the height change of the foam in a foam column to evaluate the foam stability, such as—i) the maximum height of the foam generated in the foam column, representing the foamability of tested materials, ii) the time needed for the foam to decay to half of its maximum height (half time), iii) the liquid content in the foam dependent on time and height within the column, and iv) the volume of liquid draining out of the foam as a function of time. The time-dependent foam height can be either manually measured by reading the foam height in a graduated column or via analyzing foam images assisted by an image processing software. The measurement of liquid content in foam is more complex, which can be done using a conductivity method. In Loisel's design, the foam height and the liquid content are measured automatically by the conductivity of the foam using platinum electrodes placed along the height of the foam column. Koehler et al. used a small amount of fluorescein salt to dye the foaming solution, which is excited by a UV light source and emits visible light. The liquid content in the foam was calculated by the fluorescence intensity captured by a CCD digital camera, and the relation between liquid fraction and fluorescence intensity was calibrated accordingly.

Most conventional methods for measuring foam stability suffer from poor reproducibility, labor-intensive processes, and prolonged time frames. Furthermore, the quantities used to define the foam stability are not correlated to the fundamental properties of the foam system. Accordingly, the object of the present disclosure is to provide a quick and straightforward method for foam characterization. Another object of the present disclosure is to provide a well-defined procedure for foam testing. Yet another object of the present disclosure is to provide a reliable methodology for foam stability analysis.

SUMMARY

In an exemplary embodiment, a method for evaluating the foamability of a test solution is described. The method includes forming foam in a vertical measurement column, including an open top end and a fritted plate proximal to a bottom end by passing a gas stream through the fritted plate and through the test solution present in the vertical measurement column at a gas volume rate (GVR) and a gas flow rate (GFR). The foam travels upwards in the vertical measurement column while the gas stream is passing through the test solution. The method further includes measuring the viscosity of the foam with a vibration viscometer disposed proximal to the top end of the vertical measurement column;

recording a plurality of vibration viscometer measurement results over time and storing the plurality of vibration viscometer measurement results in memory; and determining one or more foam properties of the test solution based on the plurality of vibration viscometer measurement results over time, a surfactant amount $C_{surf}$, the GVR, and the GFR. Further, if an initial viscosity measurement ($V_i$) of the test solution is above 20 cP, the test solution is tested for further characterization.

In some embodiments, the GFR is from 20 milliliters per minute (mL/min) to 500 mL/min.

In some embodiments, the surfactant is present in the test solution in a concentration of from 1 to 100 millimolar (mM) per mole test solution.

In some embodiments, the plurality of vibration viscometer measurement results comprise an initial foam viscosity ($V_i$) and a maximum foam viscosity ($V_{max}$). A drainage time ($\Delta t_d$) is calculated from the plurality of vibration viscometer measurements, defined as a time difference between a time it takes to reach the initial foam viscosity and a time it takes to reach the maximum foam viscosity.

In some embodiments, a first time interval ($t_{50}$) is calculated from the plurality of vibration viscometer measurements, defined as a time difference from a time to reach the initial foam viscosity ($V_i$) and a time viscosity drops to 50% of the maximum foam viscosity ($V_{max}$); a second time interval ($t_{25}$) is calculated from the plurality of vibration viscometer measurements, defined as a time difference from a time to reach the initial foam viscosity ($V_i$) and a time viscosity drops to 25% of the maximum foam viscosity ($V_{max}$); and a third time interval ($t_5$) is calculated from the plurality of vibration viscometer measurements, defined as a time difference from a time to reach the initial foam viscosity ($V_i$) and a time viscosity drops to 5% of the maximum foam viscosity ($V_{max}$).

In some embodiment, a first time interval ($\Delta_{50}$) is calculated from the plurality of vibration viscometer measurements, defined as a time difference from a time to reach the maximum foam viscosity ($V_{max}$) and a time viscosity drops to 50% of the maximum foam viscosity ($V_{max}$); a second time interval ($\Delta_{25}$) is calculated from the plurality of vibration viscometer measurements, defined as a time difference from a time to reach the maximum foam viscosity ($V_{max}$) and a time viscosity drops to 25% of the maximum foam viscosity ($V_{max}$); and a third time interval ($\Delta_5$) is calculated from the plurality of vibration viscometer measurements, defined as a time difference from a time to reach the maximum foam viscosity ($V_{max}$) and a time viscosity drops to 5% of the maximum foam viscosity ($V_{max}$).

In some embodiment, the method further comprises comparing the $t_{50}$, the $t_{25}$, and the $t_5$ values against each other to determine coalescence of the foam, wherein the coalescence is defined as a decrease in the viscosity of the foam once the maximum foam viscosity has been reached. In some embodiments, a higher difference between $t_{50}$ and $t_{25}$ and between $t_{25}$ and $t_5$ yields a higher coalescence value.

In some embodiments, the method further comprises comparing the $\Delta t_{50}$, the $\Delta_{25}$, and the $\Delta_5$ values against each other to determine coarsening of the foam, wherein the coarsening is defined as a decrease in the viscosity of the foam once the maximum foam viscosity has been reached; In some embodiments, a higher difference between $\Delta t_{50}$ and $\Delta_{25}$ and between $\Delta_{25}$ and $\Delta t_5$ yields a higher coarsening value.

In some embodiments, the method further includes comparing the drainage time ($\Delta t_d$) against the initial foam viscosity ($V_i$) and the maximum foam viscosity ($V_{max}$) to determine a liquid volume fraction within the foam, where the drainage time is defined as an amount of time for the test solution to drain completely from the vertical measurement column. In some embodiments, a higher difference between the initial foam viscosity ($V_i$) and the maximum foam viscosity ($V_{max}$) yields a higher drainage time.

In some embodiments, the gas stream is selected from the group consisting of air, nitrogen, carbon dioxide, oxygen, hydrogen, argon, and helium.

In some embodiments, recording the plurality of vibration viscometer measurement results occurs when a valve between the fritted plate and a mass flow controller is closed.

In some embodiments, the method further includes plotting a viscosity curve as a function of time-based on the $t_{50}$, the $t_{25}$, and the $t_5$ values to characterize a degradation of the foam.

In some embodiments, plotting a viscosity curve as a function of time based on the $\Delta_{50}$, the $\Delta_{25}$, and the $\Delta_5$ values to characterize a degradation of the foam.

In some embodiments, the vibration viscometer is above the vertical measurement column at a predetermined height.

In some embodiments, vibrating plates of the vibration viscometer are inside a vertical measurement column at a predetermined height.

In some embodiments, the vibrating plates of the vibration viscometer are disposed at a location inside the vertical measurement column at the height of 60% to 90% a height of the vertical measurement column from the bottom end.

The preceding general description of the present illustrative disclosure and the following detailed description thereof are merely exemplary aspects of the teachings of this disclosure and are not restrictive.

BRIEF DESCRIPTION OF DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
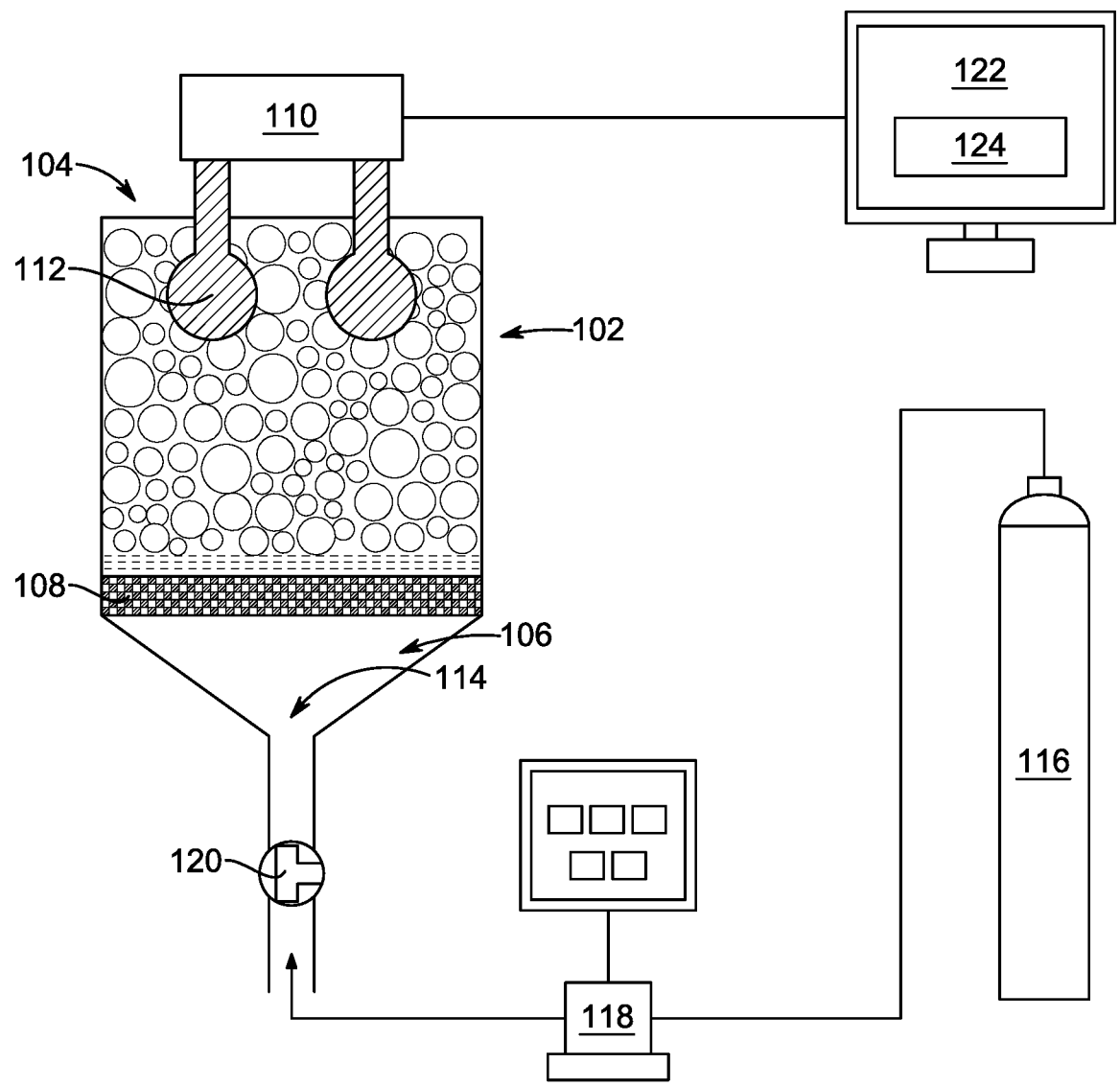
FIG. 1 is a schematic illustration of foam test apparatus, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Embodiments of the present disclosure are directed to a quick and facile method for the evaluation and characterization of foam properties, such as foamability and foam stability, of various foaming agents under well-defined conditions. The foam viscosity is measured by a non-destructive vibrational viscometer which measures the change of the measured viscosity data over time. This method of the present disclosure is experimentally convenient, highly reproducible, and fundamental.

FIG. 1 illustrates an exemplary setup including a foam test apparatus 100 (hereinafter referred to as "the apparatus 100"). According to an aspect of the present disclosure, apparatus 100 is configured to characterize and evaluate the foam properties of a solution (alternatively referred to as "test solution" in the present disclosure), such as the foamability and foam stability of the test solution. As used herein, "foamability" refers to the foam-generating power of a liquid or a tendency of a liquid to form foam. In an aspect, the apparatus 100 may also be used or implemented in determining the foamability and foam stability of a test solution. The foamability of a test solution and a gas can be determined by an initial value of the measured foam viscosity ($V_i$). If $V_i$ of a test solution is above 20 cP, more preferably above 22 cP, from 25 cP to 200 cP, from 50 cP to 100 cP, or about 75 cP, the solution may be deemed to be of good foamability. Herein, the term, "good foamability", means producing a foam of high quality that can be easily reproduced and adhere to operator satisfaction. For two different test solutions, the one that shows a higher $V_i$ has better foamability.

The apparatus 100 includes a vertical measurement column 102 with an open top end 104 and a bottom end 106, where the open top end 104 is configured to receive the test solution into the vertical measurement column 102. The vertical measurement column 102 may be configured to contain a volume of the test solution from about 50 mL to about 500 mL, preferably from 100 mL to 450 mL, preferably from 100 mL to 400 mL, preferably from 150 mL to 350 mL, preferably from 300 mL to 300 mL, or 250 mL. In an embodiment, the vertical measurement column 102 may be a cylindrical structure defining the open top end 104 and the bottom end 106. In an embodiment, the open top end 104 and the bottom end 106 are each cylindrical sections fitted above and below the vertical measurement column 102 respectively. In an embodiment, the bottom end 106 is substantially conical with a large diameter equal to a diameter of the vertical measurement column 102. In an exemplary embodiment, the vertical measurement column 102 may have a diameter in a range of about 70 mm to about 150 mm, preferably from 80 mm to 140 mm, preferably from 90 mm to 130 mm, preferably from 100 mm to 120 mm, or 110 mm, and a height of about 40 mm to about 100 mm, preferably from 50 mm to 90 mm, preferably from 60 mm to 80 mm, or 70 mm. In some embodiments, the vertical measurement column 102 may be made of glass. In some embodiments, the vertical measurement column 102 may be made of a plastic, a ceramic, plexiglass, or a rubber. A fritted plate 108 is disposed within the volume of the vertical measurement column 102 proximal to the bottom end 106. In some embodiments, the fritted plate 108 may be coupled to the bottom end 106 of the vertical measurement column 102. In an embodiment, the fritted plate 108 may be removable from the bottom end 106 of the vertical measurement column 102. In an embodiment, the fritted plate 108 is made of glass. The fritted plates 108 have a pore size in the range of 4 to 200 µm, preferably from 20 to 180 µm, preferably from 40 to 160 µm, preferably from 60 to 140 µm, preferably from 80 to 120 mm, or 100 µm. In an embodiment, there may be more than one fritted plate 108, preferably more than 2, preferably more than 3, or 5 fritted plates.

The fritted plate 108 preferably has at least two stages. A lower stage made of porous glass having an irregular pore size and pore geometry. The second stage of the frit comprises a mesh material, preferably woven, having a pore size that is similar to the average pore size of the first stage of the frit. The mesh material aids in conforming gas bubbles moving through the vertical measurement column by size and normalizing the distribution and appearance of gas bubbles across the entire upper downstream surface of the frit. Preferably at least two layers of mesh are present, oriented in a skewed manner such that the mesh fibers run at an angle of approximately 90° relative to one another.

A vibration viscometer 110 is disposed proximal to the open top end 104 of the vertical measurement column 102 to measure a viscosity of the generated foam in the vertical measurement column 102. In some embodiments, the vibration viscometer 110 may be above the vertical measurement column 102 at a predetermined height. In an embodiment, the predetermined height is from 10 cm to 50 cm over the vertical measurement column 102, preferably from 20 cm to 40 cm, or 30 cm. In an embodiment, the vibration viscometer 110 measures viscosity by energy dissipation. In an embodiment, the vibration viscometer 110 has a view port on each side to view progression of the foaming. In an embodiment, the vibration viscometer 110 has a heater to control temperature of the generated foam in the open top end 104. In an embodiment, the vibration viscometer 110 has a vibration amplitude ranging from 0.1 mm to 5 mm to avoid damage to the foam, preferably 0.5 mm to 4.5 mm, preferably 1 mm to 4 mm, preferably 1.5 mm to 3.5 mm, preferably 2 mm to 3 mm, or 2.5 mm. In an embodiment, the vibration viscometer 110 has a frequency of from 10 Hertz (Hz) to 50 Hz to avoid damaging the foam, preferably 20 Hz to 40 Hz, or 30 Hz. The vibration viscometer includes vibrating plates 112 disposed inside the vertical measurement column 102 at a predetermined height from the bottom end 106. In an embodiment, the predetermined height is from 50 cm to 150 cm above the bottom end 106, preferably from 75 cm to 125 cm, or 100 cm. In an embodiment, there are 2 to 10 vibrating plates 112, preferably 4 to 8 vibrating plates 112, or 6 vibrating plates 112. In some embodiments, the vibrating plates 112 of the vibration viscometer 110 may be disposed at a distance in a range of about 60% to about 90% of a height of the vertical measurement column 102 from the bottom end 106, preferably from 65% to 85%, preferably from 70% to 80%, or 75%. Although the top end 104 of the vertical measurement column 102 is described herein as an open end, in some embodiments, the top end may be closed and may be configured to receive the vibrating plates 112 of the vibration viscometer 110 therethrough. Such an arrangement may prevent dust particles from mixing with the test solution contained in the vertical measurement column 102. In an embodiment, the open top end 104 includes a cover on which the vibration viscometer 110 can be positioned. In an embodiment, the vibrating plates 112 have a circular shape with a diameter of from 0.02-0.2, preferably 0.05-0.1 times an inner diameter of the vertical measurement column 102. The plates are preferably in parallel planar alignment spaced apart 1-10, preferably 2-8 or 4-6×diameter of the vibrating plates.

In a preferred embodiment of the invention the vibrating plates of the vibration viscometer are disposed inside the vertical measurement column without contacting and without attachment to the vertical measurement column. The vibrating plates are attached to a vibration viscometer that is disposed on a movable stage positioned next to the vertical measurement column and preferably fastened thereto. The axis of extension (upwards and downwards) of the movable stage is in parallel alignment with the central axis of the vertical measurement column. Raising or lowering the movable stage raises or lowers the position of the vibrating plates within the vertical measurement column. The movable stage may be motorized to permit upwards and/or downwards movement of the movable stage and concurrent upwards and/or downward movement of the vibration plates inside the vertical measurement column. The vibration plates are preferably disposed on extensions permitting a continuous length of travel concurrent with extension of the movable stage and vibration viscometer from a rest point upwards of about 10 cm, preferably 5-10 cm or distance of about 5% or about 10% of the total height of the vertical measurement column measured from the top of the frit. The movable stage may be moved in conjunction with the gas flow passing upwards through the frit and the surfactant solution such that the upward speed of the vibrating plates matches the upward speed of the foam and/or gas flow volume proceeding through the vertical measurement column. In this embodiment the vibrating plates maintain an essentially static position within the foam while moving through the vertical measurement column.

Further, a funnel portion 114 extends from the bottom end 106 of the vertical measurement column 102, and a pipe extends from the funnel portion 114 along a longitudinal axis of the vertical measurement column 102. In an embodiment, the top portion of the funnel portion 114 has the same diameter as the vertical measurement column 102. In an embodiment, the funnel portion has a large diameter that is from 0.8 to 0.95 times as large as the diameter of the vertical measurement column 102, preferably from 0.825 to 0.925 times greater, preferably from 0.85 to 0.9 times greater, or 0.875 times greater. In an embodiment, the funnel portion 114 is made of glass, plexiglass, or plastic. In an embodiment, the pipe has an outer diameter that is 0.2 to 0.4 times greater than the diameter of the funnel portion 114, preferably from 0.25 to 0.35 times greater, or 0.3 times greater. In an embodiment, the pipe in the funnel portion 114 is fabricated of glass, metal, or a plastic. In an embodiment, the pipe in the funnel portion 114 includes an insulating material, such as carbon fibers, urethane sprays, or resins. The setup also includes a gas cylinder 116 disposed in fluid communication with the pipe in the funnel portion 114 via a mass flow controller 118. In an embodiment, the gas cylinder 116 contains air, nitrogen, carbon dioxide, oxygen, hydrogen, argon, helium, or a mixture thereof. In an embodiment, the gas cylinder 116 can accommodate a gas volume of from 5 liters to 50 liters, preferably from 10 liters to 40 liters, preferably from 20 liters to 30 liters, or 25 liters. The mass flow controller 118 may be configured to control the mass flow of the gas. In an embodiment, the mass flow controller 118 can accommodate a gas mass flow rate of from 20 mL/min to 500 mL/min, preferably from 100 mL/min to 400 L/min, preferably from 200 mL/min to 300 mL/min, or 250 mL/min. In an embodiment, the mass flow controller 118 is positioned between the funnel portion 114 and the gas cylinder 116. In an embodiments, the mass flow controller 118 is a ultrasonic or multiphase flow meter. In an embodiment, a valve 120 is operably coupled to the pipe. In an embodiment, the valve is positioned in a stem section of the funnel section 114. In an embodiment, the valve 120 is positioned between the mass flow controller 118 and the fritted plate 108. In an embodiment, the valve 120 is a three-way valve, a globe valve, a ball valve, a gate valve, or a check valve. In an embodiment, the valve 120 can accommodate a gas flow rate entering the funnel portion 114 of from 20 mL/min to 500 mL/min, preferably from 100 mL/min to 400 L/min, preferably from 200 mL/min to 300 mL/min, or 250 mL/min. The setup further includes a computing device 122 coupled to the vibration viscometer 110. The computing device 122 includes a memory 124 configured to receive/record inputs from the vibration viscometer 110 and further process the inputs to determine the foam characteristics of the test solution. In an embodiment, a second computing device with a second memory is configured to receive/record inputs from the mass flow controller 118 and further process inputs to determine the foam characteristics of the test solution. For a test surfactant solution, if $V_i = V_{max}$ or $V_i < 20$ cP, the surfactant solution is deemed to be of poor foamability. If $V_i < V_{max}$ or $V_i \geq 20$ cP, the surfactant solution is deemed to be of good foamability and good stability.

In operation, the test solution to be analyzed/characterized for evaluating the foam properties is poured from the open top end of the vertical measurement column 102, optionally from a pre-determined height. Suitable examples of the test solution include, but are not limited to, a surfactant solution (for example, a detergent solution, or a cream solution such as a shaving cream, milk cream, and the like), a solution and/or suspension including one or more polymers, and nanoparticles. In some embodiments, the method of the present disclosure may also be applied to measure foam stability in beverage foams, detergent foams, shaving cream, milk cream, and the like.

Further, a gas stream is passed from the gas cylinder 116, via the mass flow controller 118, and through the fritted plate 108, into the vertical measurement column 102 to generate foam. In an embodiment, the fritted plate 108 is a sintered glass frit. The fritted plates 108 have a plurality of pores of pore size in the range of 4 to 200 μm, preferably from 20 to 180 μm, preferably from to 160 μm, preferably from 60 to 140 μm, preferably from 80 to 120 μm, or 100 μm. A plurality of parameters such as gas flow rate (GFR), gas volume rate (GVR), and type of gas, may be controlled by the mass flow controller 118. Each parameter is pre-set/programmed in the mass flow controller 118 before the operation. In certain embodiments, one or more parameters may be adjusted in the mass flow controller 118 during the operation.

Alternatively, the gas stream is passed into an empty vertical measurement column 102 for a pre-determined time at a pre-determined flow rate, where the pre-determined time and the pre-determined flow rate are controlled by the mass flow controller 118. A pre-weighted amount of the test solution, such as a surfactant solution, is then poured gently into the vertical measurement column to generate foam.

In both these situations, the gas stream is passed through the pores in the fritted plate 108 and through the test solution present in the vertical measurement column 102, thereby generating foam. The pores in the fritted plate 108 allow the gas stream to pass through while keeping the liquid in the vertical measurement column 102 without leakage. The foam travels upwards in the vertical measurement column 102 while the gas stream is passed into the test solution. The valve 120 is kept open during the entire operation, to facilitate the flow of the gas stream from the gas cylinder 116 to the vertical measurement column 102.

The bubbling is carried out until the foam height reaches the neck of the vertical measurement column 102, defined by where the vibrating plates 112 reside in the vertical measurement column 102. Once the foam height reaches the neck of the vibrating plates 112, the valve 120 is closed, and a plurality of viscosity measurements are conducted with the vibrating plates 112 of the vibration viscometer 110. The viscosity measurements include an initial foam viscosity ($V_i$) and a maximum foam viscosity ($V_{max}$). From the viscosity measurements, a drainage time ($\Delta t_d$) is calculated from the initial foam viscosity ($V_i$) and the maximum foam viscosity ($V_{max}$), defined as a time difference between the time it takes to reach the initial foam viscosity and the time it takes to reach the maximum foam viscosity. In some embodiments, the plurality of vibration viscometer results (the initial foam viscosity ($V_i$) and the maximum foam viscosity ($V_{max}$)) may further be used to calculate a first time interval ($t_{50}$), defined as a time difference from a time to reach the initial foam viscosity ($V_i$) and a time viscosity drops to 50% of the maximum foam viscosity ($V_{max}$); a second time interval ($t_{25}$), defined as a time difference from a time to reach the initial foam viscosity ($V_i$) and a time viscosity drops to 25% of the maximum foam viscosity ($V_{max}$); and a third time interval ($t_5$), defined as a time difference from a time to reach the initial foam viscosity ($V_i$) and a time viscosity drops to 5% of the maximum foam viscosity ($V_{max}$). In some embodiments, the plurality of vibration viscometer results (the initial foam viscosity ($V_i$) and the maximum foam viscosity ($V_{max}$)) may further be used to calculate a time interval ($\Delta t_{50}$), defined as the time it takes to reach the initial foam viscosity ($V_i$) and a time viscosity drops to 50% of the maximum foam viscosity ($V_{max}$); a time interval ($\Delta_{25}$) between the time it takes to reach the initial foam viscosity ($V_i$) and a time viscosity drops to 25% of the maximum foam viscosity ($V_{max}$); and a time interval ($\Delta t_5$) between the time it takes to reach the initial foam viscosity ($V_i$) and a time viscosity drops to 5% of the maximum foam viscosity ($V_{max}$). The vibration viscometer results are further recorded by the computing device 122, and the results are stored in the memory 124. Further, one or more foam properties of the test solution are determined based on the vibration viscometer measurement results, a surfactant amount $C_{surf}$, the GVR, and the GFR. For instance, the foam coarsening may be determined by comparing the $\Delta_{50}$, the $\Delta_{25}$, and the $\Delta_5$ against each other. The coarsening depends on both the thickness and viscosity of the liquid film through which the gas stream passes, as well as an area of a bubble of generated foam. For instance, a foam with a higher thickness or viscosity results in a drier foam with increased shear modulus and accelerated coarsening. A higher drainage time can be obtained when there is a larger difference between ($V_{max}$) and ($V_i$). Thus, by comparing the $\Delta t_{50}$, the $\Delta_{25}$, and the $\Delta t_5$ values against one another, an approximate calculation of the coarsening can be obtained by comparing the viscosity differences at different percentages of the maximum foam viscosity $V_{max}$. Thus, the higher the $\Delta t_{50}$ $\Delta_{25}$, and $\Delta t_5$ values are between one another, the greater the difference between ($V_{max}$) and ($V_i$) is, and in turn the greater the coarsening value. The coarsening is defined as a decrease in the viscosity of the foam once the maximum foam viscosity has been reached. In another example, the liquid volume fraction within the foam may be determined by comparing the drainage time ($\Delta t_d$) against the initial foam viscosity ($V_i$) and the maximum foam viscosity ($V_{max}$). The liquid volume fraction depends on both the thickness and viscosity of the liquid film through which the gas stream passes. For instance, a foam with a lower liquid volume fraction is drier while a foam with a higher liquid volume fraction is wetter. A higher liquid volume fraction is obtained when there is a larger difference between initial foam viscosity ($V_i$) and the maximum foam viscosity ($V_{max}$). Thus, based on the initial foam viscosity ($V_i$) and the maximum foam viscosity ($V_{max}$), the greater the difference between these two values, the higher the liquid volume fraction would be. The drainage time is defined as the amount of time for the test solution to drain completely from the vertical measurement column 102. For different test surfactant solutions, if $V_i$ or $V_{max}$ of one surfactant solution is higher than $V_i$ or $V_{max}$ of others, the surfactant has better foamability than the others. If one surfactant solution has higher $t_{50}$, $t_{25}$, or $t_5$ value, or a higher $\Delta_{50}$, $\Delta_{25}$, or $\Delta t_5$ value, the surfactant has better foamability/stability than others.

Figure 2:
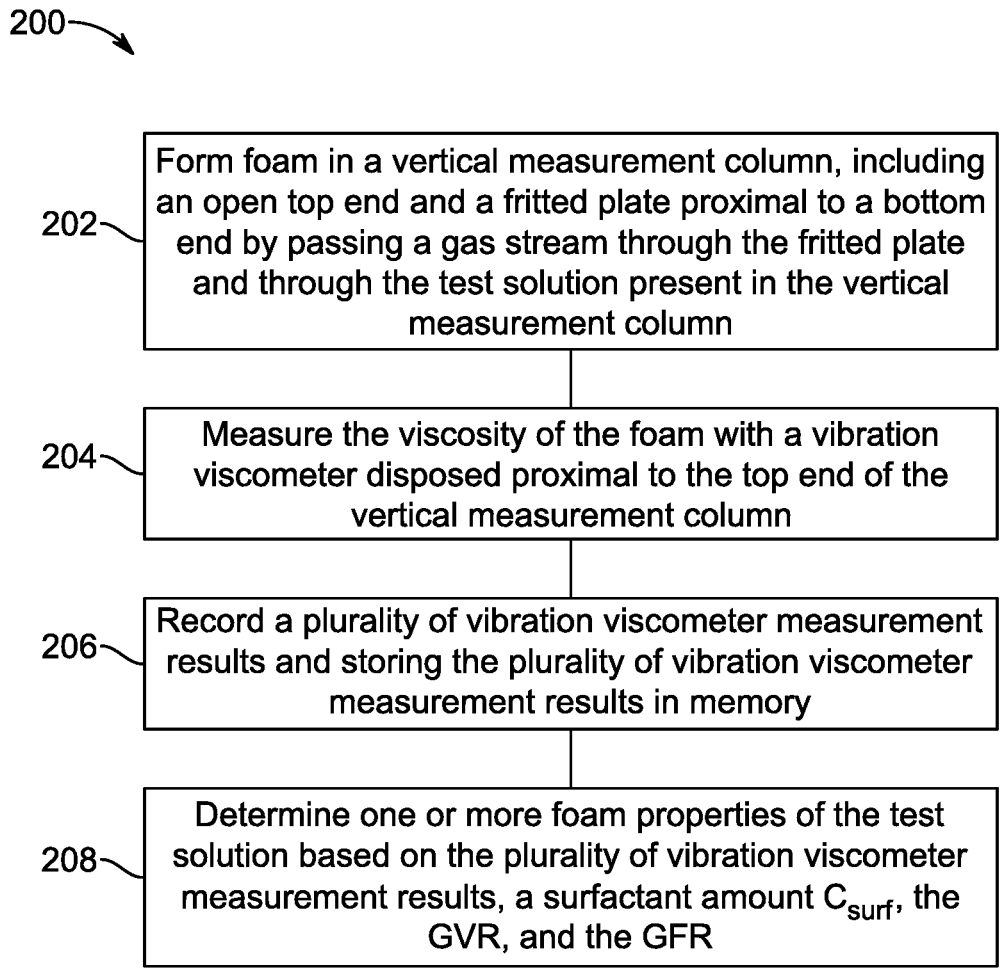
FIG. 2 is a flowchart of a method for evaluating the foamability of a test solution, according to certain embodiments.

Referring to FIG. 2, a method for evaluating the foamability of a test solution is described. At step 202, the method 200 includes forming foam in a vertical measurement column 102, including an open top end 104 and a fritted plate 108 proximal to a bottom end 106 by passing a gas stream through the fritted plate 108 and through the test solution present in the vertical measurement column 102. In other words, the foam may be formed by bubbling the gas stream provided by the gas cylinder 116 into the vertical measurement column 102, such that the foam travels upwards in the vertical measurement column 102 while the gas stream passes through the test solution. In an embodiment, the test solution is already in the vertical measurement column 102 before passing the gas stream into it. In an embodiment, the test solution is added to the vertical measurement column 102 at the same time as the gas stream enters the vertical measurement column 102. In an embodiment, the gas stream is selected from a group including nitrogen, carbon dioxide, oxygen, hydrogen, argon, helium, or a combination thereof. In a preferred embodiment, the gas stream includes nitrogen. In an embodiment, the gas stream is introduced into the vertical measurement column 102 for from 3 minutes to 30 minutes, preferably 5 minutes to 25 minutes, preferably 10 minutes to 20 minutes, or no 22 minutes. In some embodiments, various parameters such as the concentration of the test solution, temperature, pressure, GFR, and GVR, may be adjusted to generate foam. In an embodiment, the computing device 122 with memory 124 can record and adjust the various parameters. In some embodiments, the GFR into the vertical measurement column 102 is from 20 milliliters per minute (mL/min) to 200 mL/min, preferably from 40 mL/min to 180 mL/min, preferably from 60 mL/min to 160 mL/min, preferably from 80 mL/min to 140 mL/min, preferably from 100 mL/min to 120 mL/min, or 110 mL/min. In some embodiments, the surfactant is present in the test solution in a concentration of from 5 to 70 mM, preferably from 10 to 60 mM, preferably from 20 to 50 mM, preferably from 30 to 40 mM, or 35 mM. In an embodiment, the foam may be generated by any of the conventional methods known in the art, such as agitation, stirring, or pouring the test solution into the vertical measurement column 102 at a pre-determined height at a certain angle. In an embodiment, the test solution is poured into the vertical measurement column at a height ranging from 3 inches to 24 inches above the open top end 104, preferably from 6 inches to 18 inches, or 12 inches. In an embodiment, the test solution is poured into the vertical measurement column at a angle ranging 10 degrees to 90 degrees relative to the open top end 104, preferably from 20 to 80 degrees, preferably from 30 to 70 degrees, preferably from 40 to 60 degrees, or 45 degrees. In an embodiment, the vertical measurement column 102 and the sintered glass frit 108 are each preferably washed thoroughly with isopropanol and water three times before performing the experiment (forming the foam). In an embodiment, the vertical measurement column 102 and the sintered glass frit 108 are preferably each dried in an oven at 80° C. prior to performing the experiment. In an embodiment, the plurality of vibration viscometer measurement results includes a change of measured viscosity data over time. In an embodiment, the viscosity data measurements are recorded in a time interval that is the difference from the time it takes to reach the initial foam viscosity and a time it takes to reach the maximum foam viscosity (the drainage time). Further, this time range is usually from 15 minutes to 5 hours, preferably from 1 hour to 4 hours, or preferably 2.5 hours. In an embodiment, the cleaning and drying of the vertical measurement column 102 and the sintered glass frit 108 are preferably each performed 2 hours prior to performing the experiment. The rate of the foam viscosity changing with time may also be used to determine or characterize the foam stability. The faster the viscosity decreases with time, the less stable foam is. For example, $t_{50}$, $t_{25}$, $t_5$ or $\Delta_{50}$, $\Delta_{25}$, $\Delta_5$ values are used to characterize foam stability. A higher t value represents better stability and a faster viscosity decrease with time.

At step 204, the method 200 includes measuring the viscosity of the foam with a vibration viscometer 110 disposed proximal to the top end 104 of the vertical measurement column 102. In an embodiment, the vibration viscometer 110 is positioned directly on the open top end 104 of the measurement column. In an embodiment, the vibration viscometer 110 sits atop a cover disposed atop the open top end 104, with apertures in the cover to allow the vibrating plates to hang feely in the vertical measurement column 102. In an embodiment, the viscosity of the foam generated may be measured by vibrating plates 112 of the vibration viscometer 110 that are disposed at a location inside the vertical measurement column 102 at a pre-determined height. The pre-determined height is preferably about 60% to 90% of the vertical measurement column 102 from the bottom end 106, preferably from 65% to 85%, preferably from 70% to 80%, or 75%. In an embodiment, the vibrating plates 112 can be lowered to reach the bottom half of the vertical measurement column 102. In an embodiment, the measuring the viscosity of the foam occurs while the valve 120 is closed and the gas stream is not flowing into the vertical measurement column 102. In an embodiment, the vibration viscometer further includes a mixing cell for foam to enter and a holding cup for foam to be stored to measurement purposes. In an embodiment, mounted proximal to the vibration viscometer 110 is a plurality of pressure and temperature gauges to monitor the pressure and temperature of the generated foam respectively. In an embodiment, the vibration viscometer includes a valve to control the amount of foam entering through the mixing cell and the generation rate of foam is measured. In an embodiment, the vibration viscometer has a vibration amplitude ranging from 0.1 mm to 5 mm to avoid damage to the foam, preferably 0.5 mm to 4.5 mm, preferably 1 mm to 4 mm, preferably 1.5 mm to 3.5 mm, preferably 2 mm to 3 mm, or 2.5 mm. In an embodiment, the vibration viscometer has a frequency of from 10 Hertz (Hz) to 50 Hz to avoid damaging the foam, preferably 20 Hz to 40 Hz, or 30 Hz.

At step 206, the method 200 includes recording a plurality of vibration viscometer measurement results and storing the plurality of vibration viscometer measurement results in memory 124. The plurality of vibration viscometer measurement results includes the $V_i$ and $V_{max}$. Further, $\Delta t_d$ is calculated from the vibration viscometer measurement results, and is defined as a time difference between the time it takes to reach the initial foam viscosity and the time it takes to reach the maximum foam viscosity. In some embodiments, the plurality of vibration viscometer measurement results further includes a time interval ($t_{50}$) between the time it takes to reach the initial foam viscosity ($V_i$) and a time viscosity drops to 50% of the maximum foam viscosity ($V_{max}$), a time interval ($t_{25}$) between the time it takes to reach the initial foam viscosity ($V_i$) and a time viscosity drops to 25% of the maximum foam viscosity ($V_{max}$), and a time interval ($t_5$) between the time it takes to reach the initial foam viscosity ($V_i$) and a time viscosity drops to 5% of the maximum foam viscosity ($V_{max}$). The plurality of vibration viscometer measurement results occurs when a valve 120 between the fritted plate 108 a mass flow controller 118 is closed. In an embodiment, the stored viscosity measurement results stored in the memory 124 are used to determine the pre-determined height to hang the vibration viscometer 110 for future trials. In an embodiment, the recording once the valve 120 is closed lasts from 5 minutes to 180 minutes, preferably from 25 minutes to 175 minutes, preferably from 50 minutes to 150 minutes, preferably 75 minutes to 125 minutes, or 100 minutes. In an embodiment, the recording stops if the pressure or temperature in the vertical measurement column 102 is too high.

At step 208, the method 200 includes determining one or more foam properties of the test solution based on the plurality of vibration viscometer measurement results, a surfactant amount $C_{surf}$, the GVR, and the GFR. In an embodiment, apparatus 100 includes a gas flow meter, coupled with the vibration viscometer 110, to measure the foam properties. In an embodiment, the foaming property, for example, the foam coalescence may be determined by comparing the $t_{50}$, the $t_{25}$, and the $t_5$ values against each other. The coarsening is defined as a decrease in the viscosity of the foam once the maximum foam viscosity has been reached. In another example, the liquid volume fraction within the foam may be determined by comparing the drainage time ($\Delta t_d$) against the initial foam viscosity ($V_i$) and the maximum foam viscosity ($V_{max}$). The drainage time is defined as the amount of time for the test solution to drain completely from the gas stream passing through it. In an embodiment, the foam stability of the test solution may be determined by plotting a viscosity curve as a function of time-based on the $t_{50}$, the $t_{25}$, and the $t_5$ values to characterize a degradation of the foam. In an embodiment, the foam stability of the test solution may be determined by plotting a viscosity curve as a function of time based on the $\Delta_{50}$, the $\Delta_{25}$, and the $\Delta_5$ values to characterize a degradation of the foam. The GFR and GVR will help calculate foam characteristics if $V_i$ of a test solution is above 20 cP. For instance, a foam created with a higher GFR and GVR will produce a foam with a better foamability. GFR and GVR will not help calculate foam characteristics if GFR or GVR is kept the same for different measurements, and thus have to be compared across various created foams with varying GFRs and GVRs. In an embodiment, if an initial viscosity measurement ($V_i$) of the test solution is above 20 cP, the test solution is tested for further characterization. Further characterization can include measuring the foam's conductivity, concentration, drainage, or other parameter of interest to understand the generated foam with the specific GVR/GFR/surfactant amount more conclusively. In an embodiment, the further characterization also includes packaging the generated foam with the specific GVR/GFR/surfactant amount for further testing to ensure accuracy of the results. In an embodiment, further characterization includes repeating the experiment again at the same operating conditions. In an embodiment, further characterization includes repeating the experiment again at different operating conditions, including varying the GFR, GVR, or surfactant amount from the original operating conditions.

EXAMPLES

The disclosure will now be illustrated with working examples, which is intended to illustrate the working of disclosure and not intended to restrictively imply any limitations on the scope of the present disclosure. The working examples depict a method of evaluating foam viscosity, with a foam testing apparatus, of the present disclosure.

Example 1: Setting Up the Foam Test Apparatus

The glass column (vertical measurement column) and the sintered glass frit (fritted plate) are each washed thoroughly with isopropanol and water three times and then dried in the oven at 80° C. for 2 hours prior to performing the experiment. The glass column is then connected through the bottom tube of the gas inlet to a gas cylinder via a valve that is used between the sintered glass frit and the gas tube. A vibrating viscometer with a plurality of vibrating plates (sensors) is hung inside the column at a specific height, for example, at a height of 60% to 90% of the total height of the glass column from the bottom end. The vibrational viscometer includes the Vibro Viscometer SV-10/SV-100 (manufactured by A&D Engineering Inc, 4622 Runway Boulevard Ann Arbor, MI 48108, U.S.A.) or other qualified counterparts.

During operation, the foaming gas is introduced into the empty glass column at a specific flow rate for 3 minutes. The mass flow controller controls the desired flow rate. A pre-weighted amount of surfactant solution or the test solution is poured gently into the glass column. The foam is generated by bubbling gas through the sintered glass frit continuously. Once the foam height reaches the neck of the sensor plates, the valve is closed, and the foam viscosity is measured with the help of a vibrating viscometer. The viscosity data is recorded automatically by a computer.

The apparent viscosity of a foam changes over time due to the evolution of the foam texture. Therefore, the foam stability can be represented by the foam viscosity measurement. Further, different processes dominating the foam decay can be interpreted by the trend of foam viscosity over time.

Figure 3A:
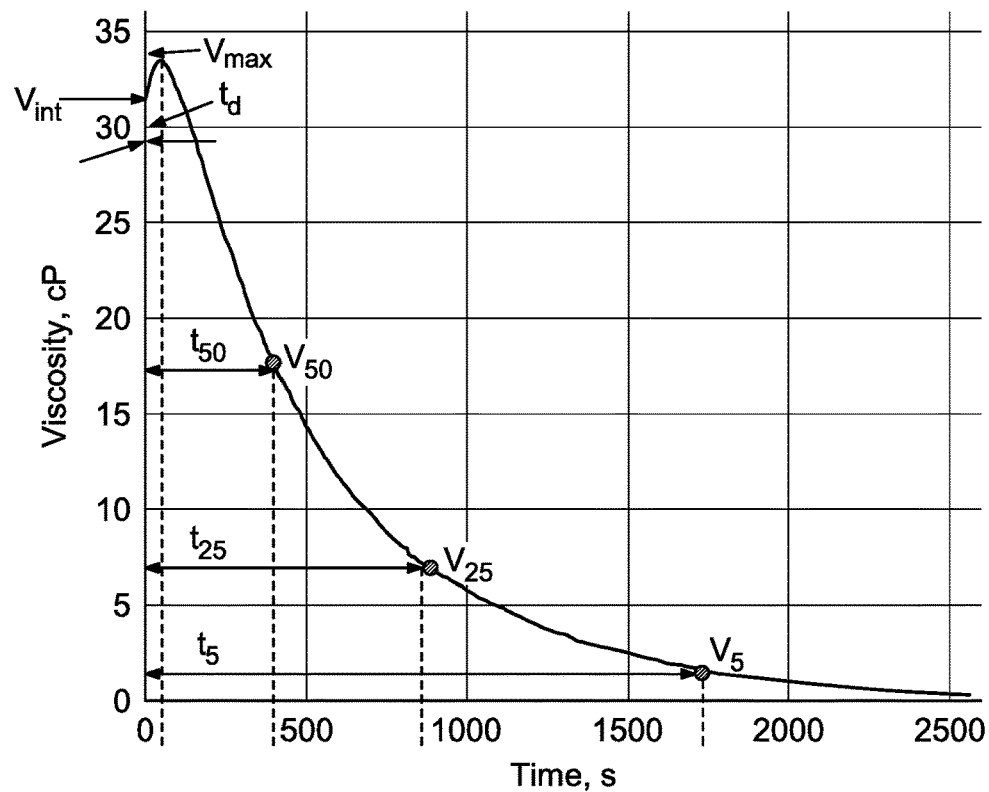
FIG. 3A is a graph illustrating the variation of foam viscosity as a function of time, according to certain embodiments.
Figure 3B:
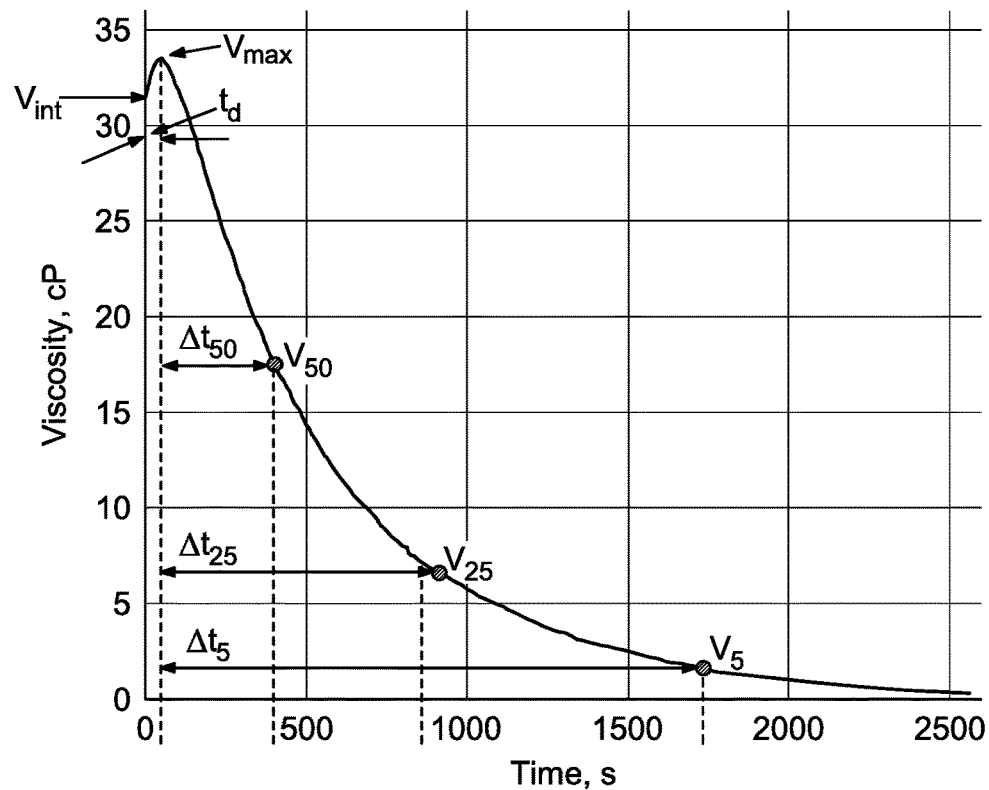
FIG. 3B is a graph illustrating the variation of foam viscosity as a function of time with a predetermined surfactant solution amount, according to certain embodiments.

A typical result of foam viscosity measurement using the method presented in this invention is shown in FIG. 3. For this purpose, 10 mM sodium dodecyl sulfate (SDS) was used as the test solution, and $N_2$ was used as the gas stream. The initial foam viscosity ($V_{ini}$) and the maximum foam viscosity ($V_{max}$) are measured to characterize the foamability of the foams. Formability refers to the overall ability of a foaming solution to generate foams using a certain gas. For different foaming agents, their foamability can be compared directly using either one of the two parameters. The characteristic time for drainage ($t_d$) is measured to represent foam stability dominated by drainage. $\Delta t_d$ is defined by the time interval between the initial foam viscosity ($V_{ini}$) and the maximum foam viscosity ($V_{max}$). Foam viscosity increases with the decrease of liquid fraction in the foam. A lower value of t d means the foam has weaker stability against drainage. The time interval between the initial foam viscosity ($V_{ini}$) and the time when the viscosity drops to 50%, 25%, and 5% ($V_{50}$, $V_{25}$, and $V_5$) of the peak value are measured to represent foam stability dominated by coalescence and coarsening, namely the characteristic times for coalescence and coarsening ($t_{50}$, $t_{25}$, and $t_5$). The time interval between the maximum foam viscosity ($V_{max}$) and the time when the viscosity drops to 50%, 25%, and 5% ($V_{50}$, $V_{25}$, and $V_5$) of the peak value can also be used, namely $\Delta t_{50}$, $\Delta_{25}$, and $\Delta t_5$. The definition of $t_{50}$, $t_{25}$, $t_5$, $\Delta t_{50}$, $\Delta_{25}$, and $\Delta t_5$ are illustrated in FIGS. 3A and 3B. Once the foam viscosity increases to the peak, a decrease in foam viscosity is observed. This decrease in foam viscosity is caused by bubble coalescence and coarsening. In comparison to drainage, coalescence and coarsening take a much longer time in foam decay. Therefore, $t_{50}$, $t_{25}$, $t_5$, $\Delta t_{50}$, $\Delta_{25}$, and $\Delta t_5$ are the major parameters used to compare foam stability.

Figure 4:
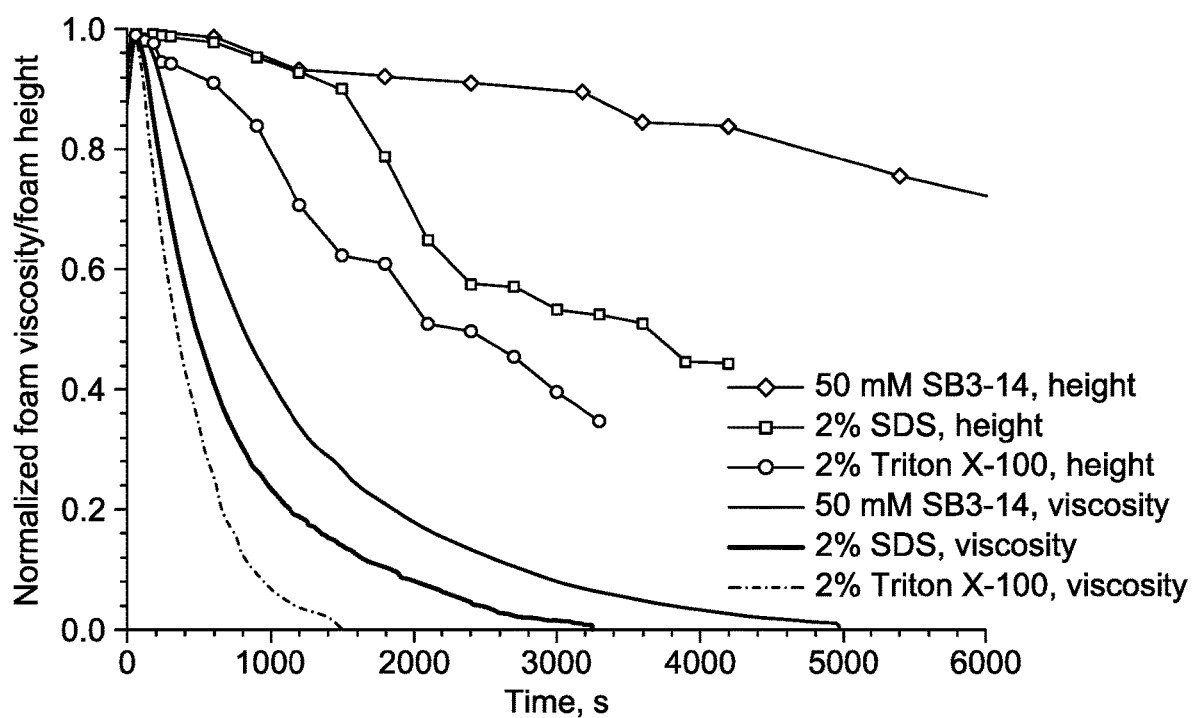
FIG. 4 is a plot comparing foam stability results measured by vibrational viscometer and foam column for three aqueous surfactant solutions, according to certain embodiments.

Referring to FIG. 4, a graph illustrating the variation of foam viscosity as a function of time is depicted. For better comparison, the foam viscosity and foam height were normalized from 1 to 0 by dividing each point by the maximum value in each curve. The study was performed with three surfactants, namely—50 mM of SB3-14, 2% SDS, and 2% Triton-X 100. The results indicate that the normalized foam viscosity trend and the foam height trend for all three surfactants show the same stability.

Figure 5A:
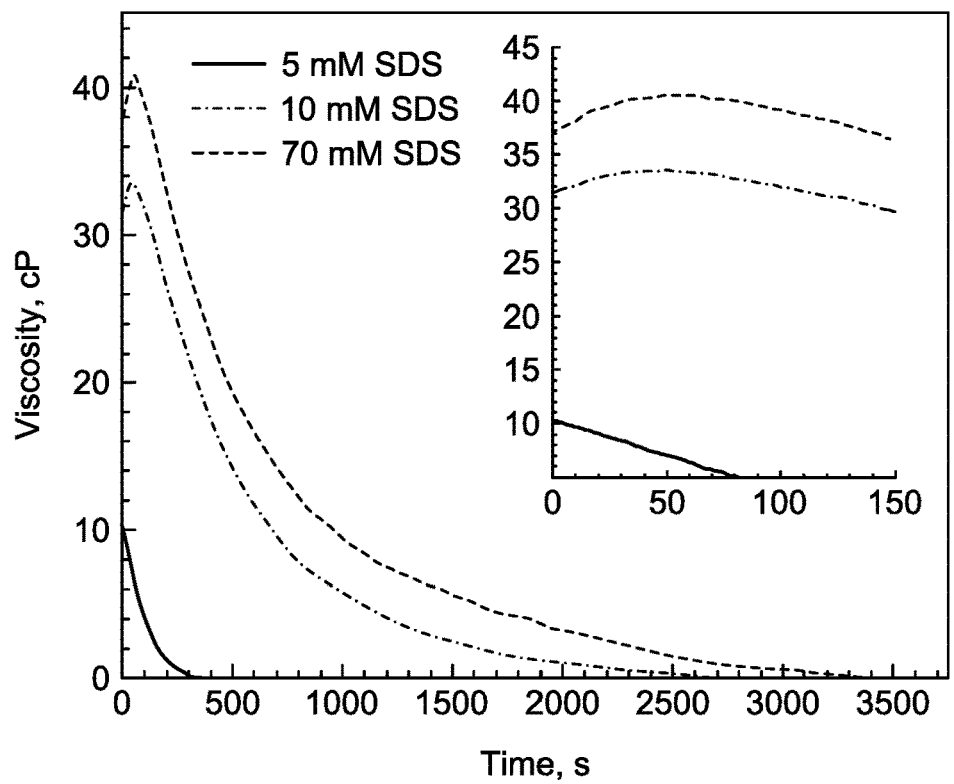
FIG. 5A depicts the variation of foam viscosity as a function of time for SDS foam, at various concentrations, according to certain embodiments.
Figure 5B:
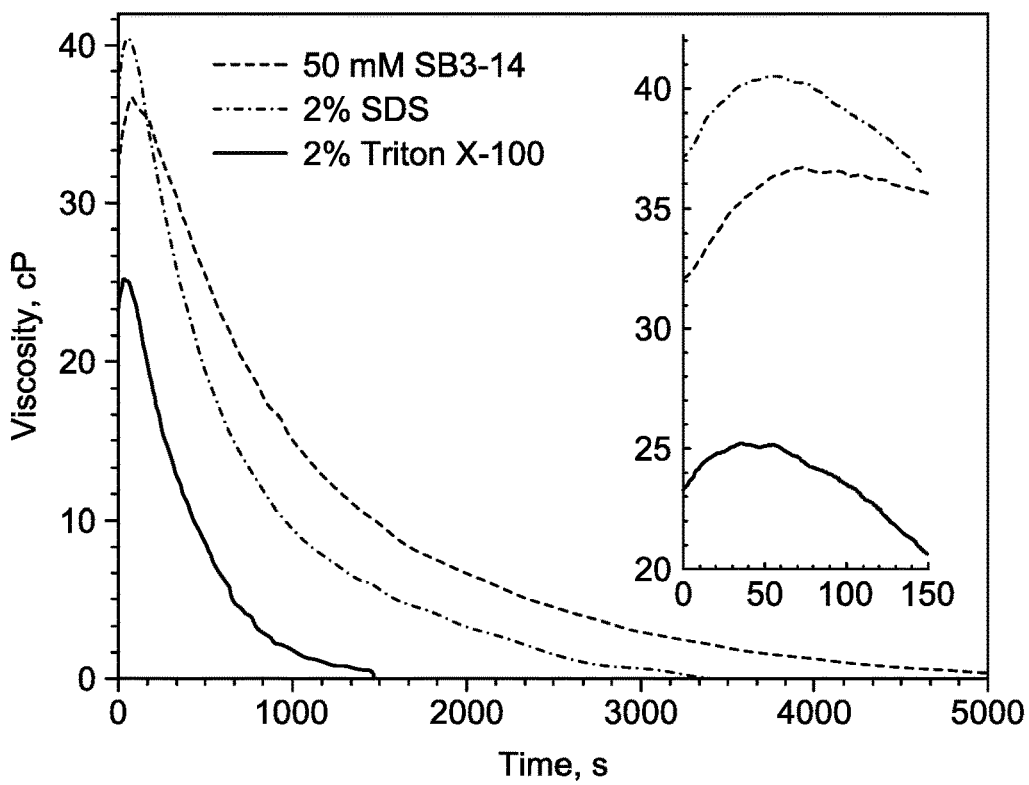
FIG. 5B depicts the variation of foam viscosity as a function of time for a mixture of SDS foam and Triton X-100 foam, at various concentrations, according to certain embodiments.

The method of the present disclosure can evaluate the foam stability of the same surfactants at different concentrations or different surfactants at the same concentration. FIG. 5A depicts the variation of foam viscosity as a function of time for SDS foam at various concentrations, namely 5 mM, 10 mM, and 70 mM. From the plot, it can be observed that the foamability of SDS with different concentrations ranks as 70 mM>10 mM>5 mM, and the foam stability follows the same trend. The stability measurements of foams made of sodium dodecyl sulfate (SDS), 3-(N,N-dimethylmyristylammonio)propane sulfonate (SB3-14), and Triton X-100 are shown in FIG. 5B. The data indicates that the foamability ranks as 2% SDS>50 mM SB3-14>2% Triton X-100 and for foam stability: 50 mM SB3-14>2% SDS>2% Triton X-100.

Figure 6A:
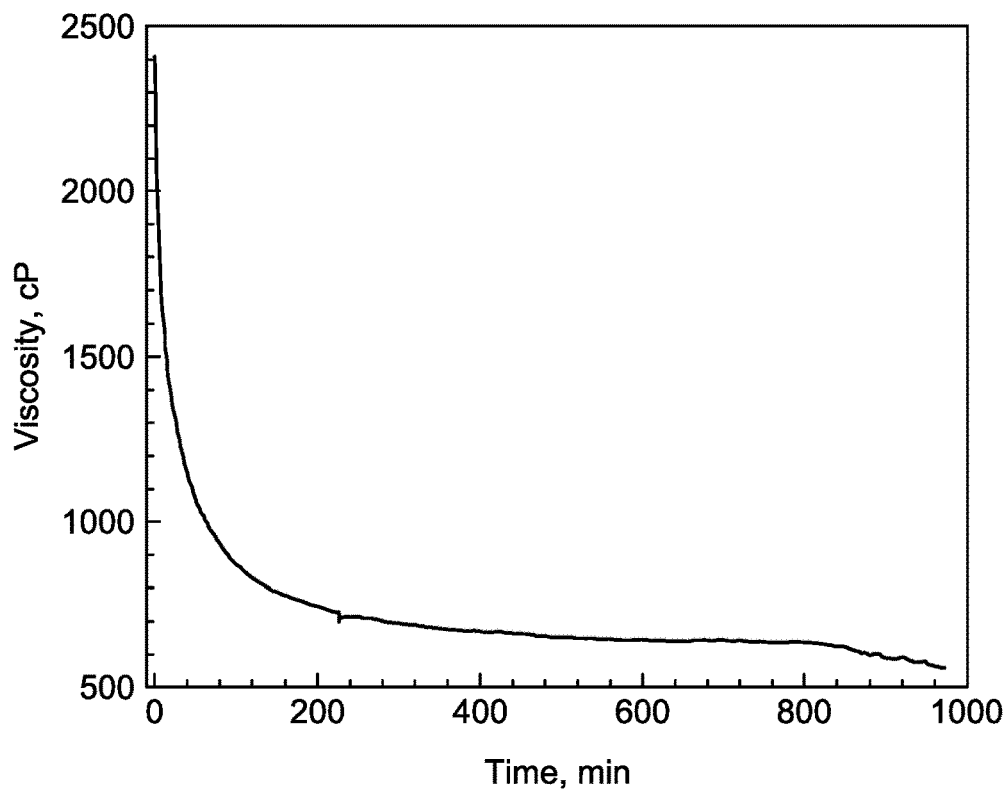
FIG. 6A is a graph illustrating the variation of foam viscosity as a function of time for Gillete shaving cream, according to certain embodiments.
Figure 6B:
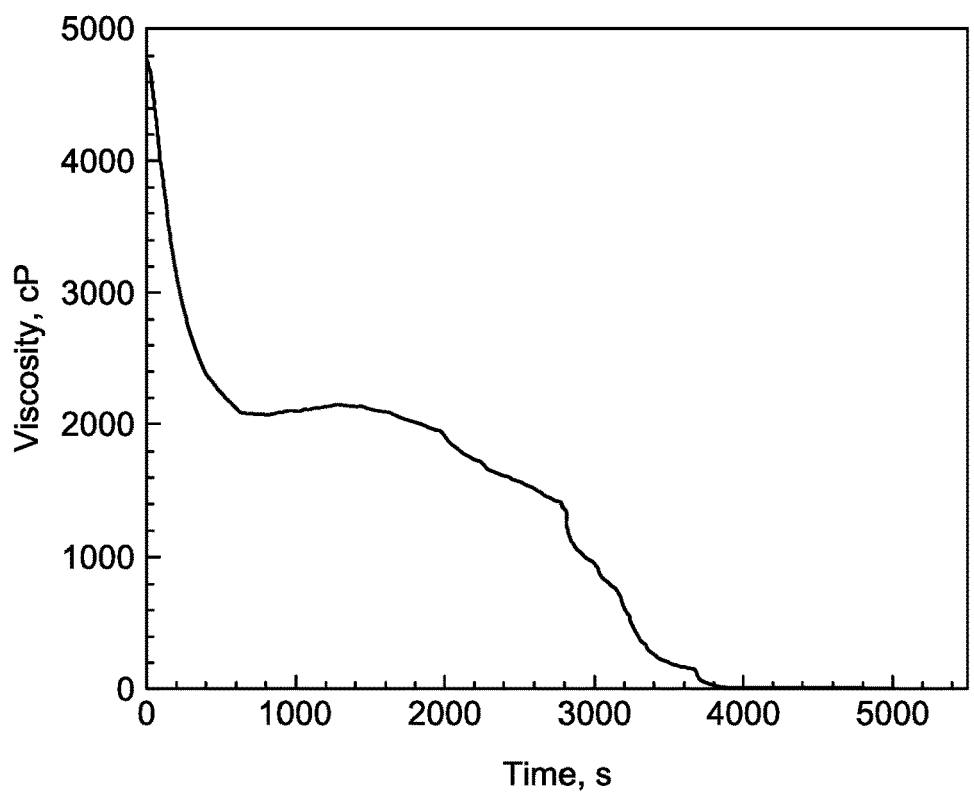
FIG. 6B is a graph illustrating the variation of foam viscosity as a function of time for Baskin Robbins whipped cream, according to certain embodiments.

The method presented in this invention can apply to the stability measurement of ultra-stable foams like polymer-stabilized foams and unstable foams like milk cream. FIG. 6A shows the result of the foam stability measurement of Gillette shaving cream (regular). The viscosity curve of Gillette™ shaving cream drops smoothly with time where $t_{50}$ and $t_{25}$ are 35 min and 874 minutes, respectively. FIG. 6B shows the result of the foam stability measurement of Baskin Robbins™ whipped cream. The viscosity curve of the whipped cream drops smoothly in the beginning and then decreases abruptly to zero due to the foam collapse. The $t_{50}$, $t_{25}$, and $t_5$ 419 s, 2826 s, and 3425 s, respectively.

The present disclosure is directed to methods and systems for evaluating the foamability of a test solution using a vibrational viscometer. Unlike the conventional methods, the present disclosure evaluates foamability under well-defined boundary conditions of foam generation, including specific amounts of gas supply, surfactant solution supply, and a specific gas flow rate. Further, the vibration of the vibrational plate is minor, and the damage to the foam structure by the exerted force can be avoided. For instance, the Vibro Viscometer SV-10 has an oscillator frequency of 30 Hertz, and the vibration amplitude is 0.4 mm. Therefore, the aging behavior of static foams can be efficiently captured non-destructively. Furthermore, the viscosity of the test solution can be measured with high sensitivity by the method of the present disclosure. A minor change in the foam texture (e.g., liquid fraction and bubble size) can be detected by the probes (vibrating plates). Also, the method is simple in that it obviates the need to use any auxiliary devices such as a light source, a CCD camera, etc. The reading of the data is automatic, and the interpretation of the data is straightforward. The method is highly convenient because the foam stability can reasonably be characterized by short-time measurements, with high reproducibility.

Numerous modifications and variations of the present disclosure are possible in light of the above teachings. It is therefore to be understood that within the scope of the appended claims, the invention may be practiced otherwise than as specifically described herein.

The invention claimed is:

1. A method for evaluating foamability of a test solution, comprising:
    forming a foam in a vertical measurement column comprising an open top end and a fritted plate proximal to a bottom end by passing a gas stream through the fritted plate and through the test solution present in the vertical measurement column at a gas volume rate (GVR) and a gas flow rate (GFR), wherein the foam travels upwards in the vertical measurement column while the gas stream is passing through the test solution;
    measuring the viscosity of the foam with a vibration viscometer disposed proximal to the top end of the vertical measurement column;
    recording a plurality of vibration viscometer measurement results over time and storing the plurality of vibration viscometer measurement results in memory; and
    determining one or more foam properties of the test solution based on the plurality of vibration viscometer measurement results over time, a surfactant amount $C_{surf}$, the gas volume rate (GVR), and the gas flow rate (GFR);
    further characterizing the foamability of the test solution as good when an initial viscosity measurement ($V_i$) of the test solution is above 20 cP.

2. The method of claim 1, wherein the GFR is from 20 milliliters per minute (mL/min) to 500 mL/min.

3. The method of claim 1, wherein the surfactant is present in the test solution in a concentration of from 1 to 100 mM per mole test solution.

4. The method of claim 1, wherein the plurality of vibration viscometer measurement results comprise an initial foam viscosity ($V_i$) and a maximum foam viscosity ($V_{max}$); wherein:
    a drainage time ($\Delta t_d$) is calculated from the plurality of vibration viscometer measurements, defined as a time difference between a time it takes to reach the initial foam viscosity and a time it takes to reach the maximum foam viscosity.

5. The method of claim 4, wherein a first time interval ($t_{50}$) is calculated from the plurality of vibration viscometer measurements, defined as a time difference from a time to reach the initial foam viscosity ($V_i$) and a time viscosity drops to 50% of the maximum foam viscosity ($V_{max}$);
    a second time interval ($t_{25}$) is calculated from the plurality of vibration viscometer measurements, defined as a time difference from a time to reach the initial foam viscosity ($V_i$) and a time viscosity drops to 25% of the maximum foam viscosity ($V_{max}$); and
    a third time interval ($t_5$) is calculated from the plurality of vibration viscometer measurements, defined as a time difference from a time to reach the initial foam viscosity ($V_i$) and a time viscosity drops to 5% of the maximum foam viscosity ($V_{max}$).

6. The method of claim 5, wherein a first time interval ($\Delta t_{50}$) is calculated from the plurality of vibration viscometer measurements, defined as a time difference from a time to reach the maximum foam viscosity ($V_{max}$) and a time viscosity drops to 50% of the maximum foam viscosity ($V_{max}$);
    a second time interval ($\Delta t_{25}$) is calculated from the plurality of vibration viscometer measurements, defined as a time difference from a time to reach the maximum foam viscosity ($V_{max}$) and a time viscosity drops to 25% of the maximum foam viscosity ($V_{max}$); and
    a third time interval ($\Delta t_5$) is calculated from the plurality of vibration viscometer measurements, defined as a time difference from a time to reach the maximum foam viscosity ($V_{max}$) and a time viscosity drops to 5% of the maximum foam viscosity ($V_{max}$).

7. The method of claim 5, wherein the method further comprises comparing the $t_{50}$, the $t_{25}$, and the $t_5$ values against each other to determine coalescence of the foam, wherein the coalescence is defined as a decrease in the viscosity of the foam once the maximum foam viscosity has been reached; and
    a higher difference between $t_{50}$ and $t_{25}$ and between $t_{25}$ and $t_5$ yields a higher coalescence value.

8. The method of claim 6, wherein the method further comprises comparing the $\Delta t_{50}$, the $\Delta t_{25}$, and the $\Delta t_5$ values against each other to determine coarsening of the foam, wherein the coarsening is defined as a decrease in the viscosity of the foam once the maximum foam viscosity has been reached; and
    a higher difference between $\Delta t_{50}$ and $\Delta t_{25}$ and between $\Delta t_{25}$ and $\Delta t_5$ yields a higher coarsening value.

9. The method of claim 4, wherein the method further comprises comparing the drainage time ($\Delta t_d$) against the initial foam viscosity ($V_i$) and the maximum foam viscosity ($V_{max}$) to determine a liquid volume fraction within the foam, wherein the drainage time is defined as an amount of time for the test solution to drain completely from the vertical measurement column; and
    a higher difference between the initial foam viscosity ($V_i$) and the maximum foam viscosity ($V_{max}$) yields a higher drainage time.

10. The method of claim 1, wherein the gas stream comprises at least one gas selected from the group consisting of air, nitrogen, carbon dioxide, oxygen, hydrogen, argon, and helium.

11. The method of claim 1, wherein the recording the plurality of vibration viscometer measurement results occurs when a valve between the fritted plate and a mass flow controller is closed.

12. The method of claim 5, further comprising:
plotting a viscosity curve as a function of time based on the $t_{50}$, the $t_{25}$, and the $t_5$ values to characterize a degradation of the foam.

13. The method of claim 6, further comprising:
plotting a viscosity curve as a function of time based on the $\Delta t_{50}$, the $\Delta t_{25}$, and the $\Delta t_5$ values to characterize a degradation of the foam.

14. The method of claim 1, wherein the vibration viscometer is above the vertical measurement column at a predetermined height.

15. The method of claim 14, wherein vibrating plates of the vibration viscometer are disposed inside the vertical measurement column at a predetermined height.

16. The method of claim 15, wherein the vibrating plates of the vibration viscometer are disposed at a location inside the vertical measurement column at a height of from 60% to 90% a height of the vertical measurement column from the bottom end.

17. The method of claim 11, wherein the fritted plate has a first stage and a second stage, wherein the first stage comprises a porous fritted glass material, and the second stage, positioned immediately adjacent to the first stage, comprises two mesh layers each having a pore size that is within 50% of the average pore size of the porous fritted glass material of the first stage, wherein each mesh layer is a woven mesh layer and the layers are oriented at a skew of about 90° to one another.

* * * * *